United States Patent [19]

Grittner et al.

[11] 4,281,871
[45] Aug. 4, 1981

[54] MOTOR VEHICLE SEAT MOUNTED WITH LONGITUDINAL SLIDING MOBILITY

[75] Inventors: Heinz Grittner, Kürten; Ralf Giese, Frechen, both of Fed. Rep. of Germany

[73] Assignee: Ford Motor Company, Dearborn, Mich.

[21] Appl. No.: 117,168

[22] Filed: Jan. 31, 1980

[51] Int. Cl.³ .............................................. B60N 1/08
[52] U.S. Cl. .................................. 296/65 R; 248/429
[58] Field of Search ............. 296/65 R; 248/424, 429, 248/430, 416, 425

[56] References Cited

U.S. PATENT DOCUMENTS

| 3,279,737 | 10/1966 | Krause | 248/430 |
| 3,702,179 | 11/1972 | Radke et al. | 248/430 |
| 3,711,057 | 1/1973 | Marx | 248/430 |

FOREIGN PATENT DOCUMENTS 1505747  2/1977  Fed. Rep. of Germany ........... 248/430

Primary Examiner—Joseph F. Peters, Jr.
Assistant Examiner—Norman L. Stack, Jr.
Attorney, Agent, or Firm—John J. Roethel; Clifford L. Sadler

[57] ABSTRACT

A motor vehicle seat mounted for longitudinal sliding mobility, the seat frame of which is braced by slide blocks fixed to lateral connecting brackets on two parallel, upright, C-shaped guide rails. One of the C-shaped guide rails is fixed to the approximately vertical web surface of the central floor assembly tunnel and is provided with a latch device for determining the desired seat position.

3 Claims, 3 Drawing Figures

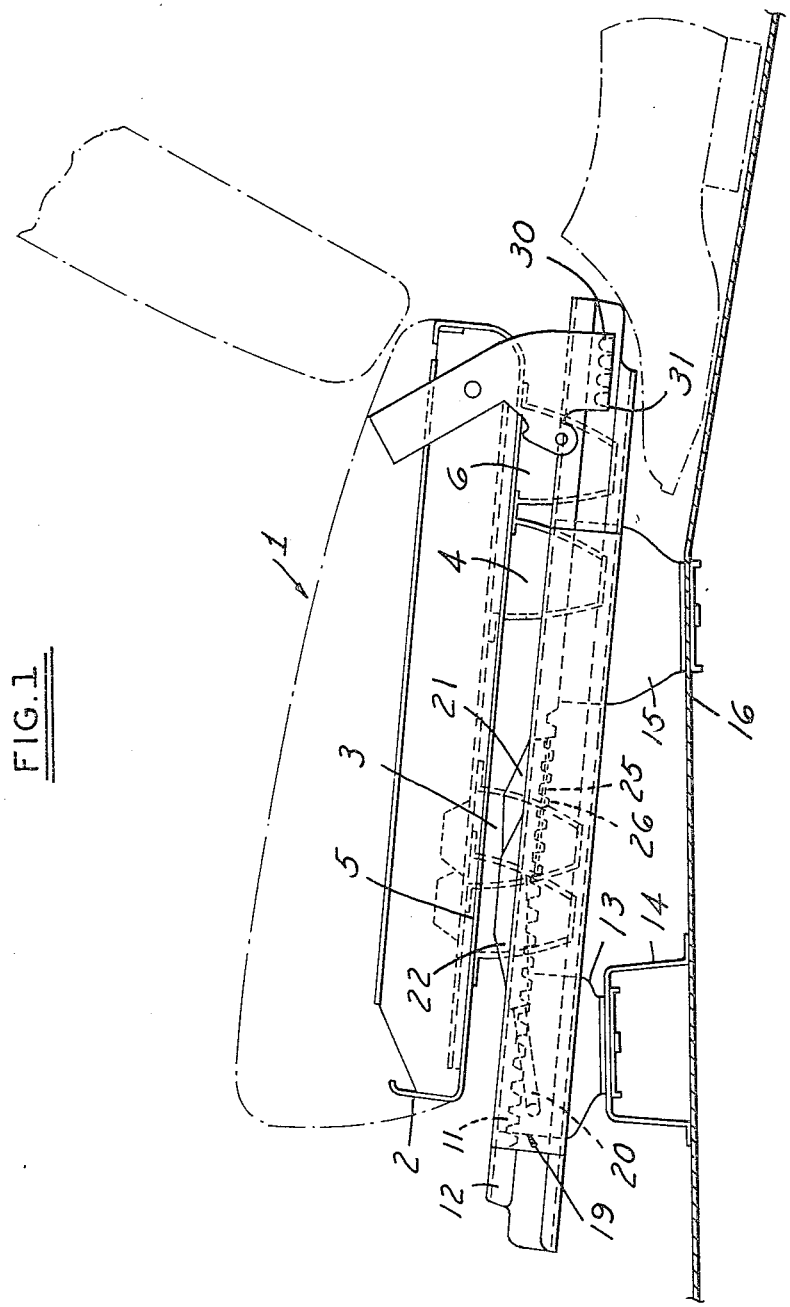

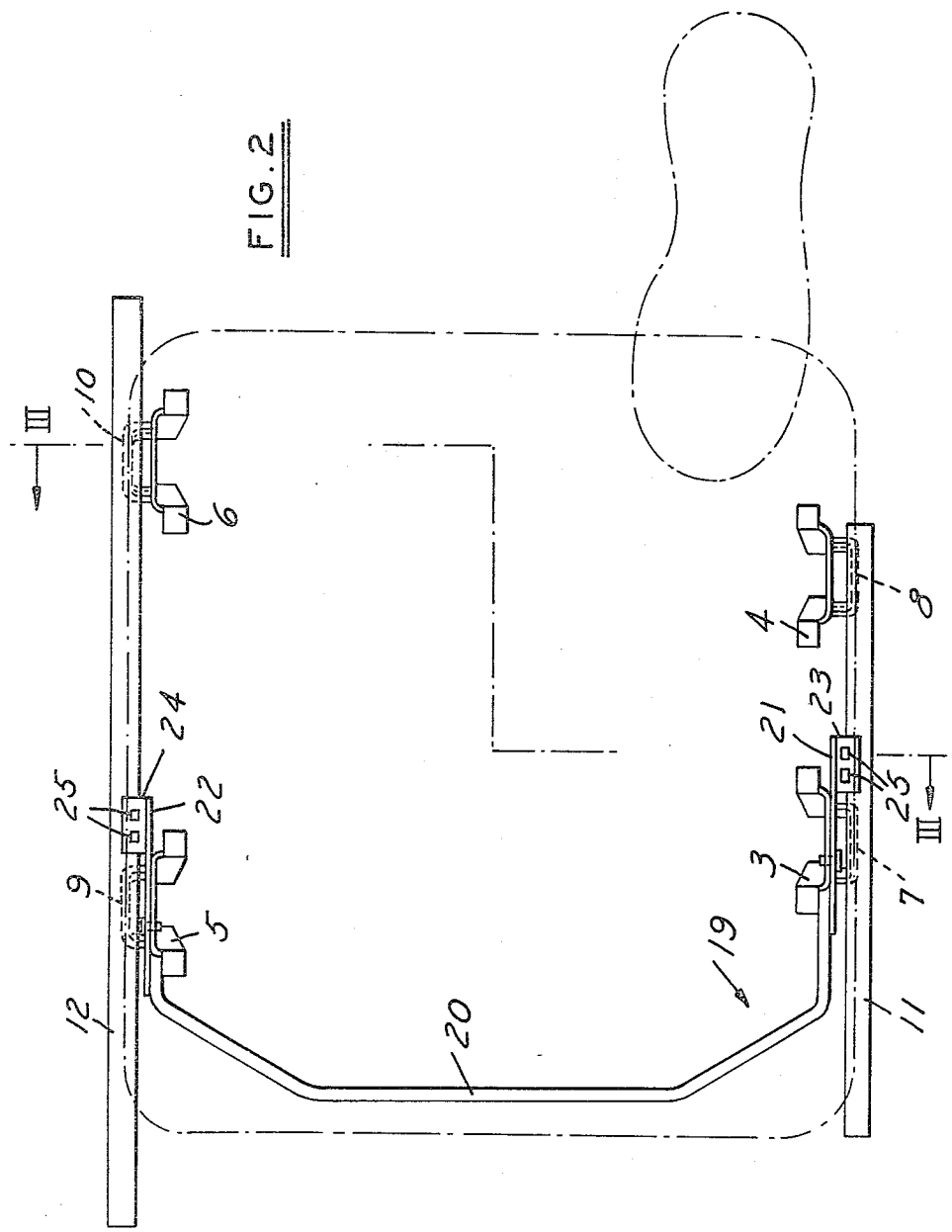

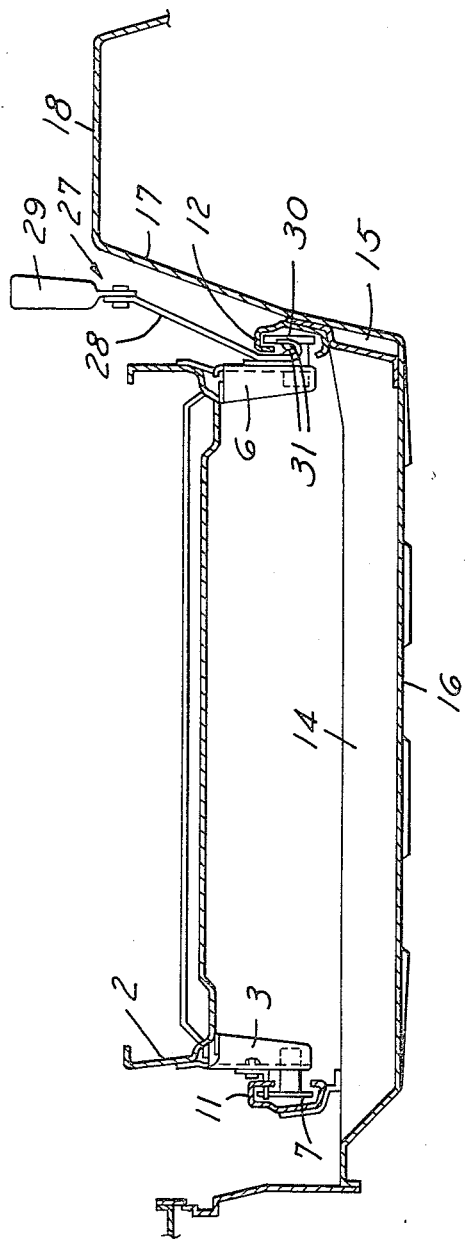

MOTOR VEHICLE SEAT MOUNTED WITH LONGITUDINAL SLIDING MOBILITY

BACKGROUND OF THE INVENTION

A motor vehicle seat mounted for longitudinal sliding mobility of the type is already known from German DE-AS No. 1505747. This known motor vehicle seat largely solves the problem of keeping the foot space of a passenger sitting in the rear of a motor vehicle free of projecting ends of guide rails and, nevertheless, to ensure an adequate guide length for the motor vehicle seat. However, the known motor vehicle seat exhibits the disadvantage that it necessitates a substantial structural outlay due to the arrangement of two parallel, equal length, upright, C-shaped guide rails which are preferably secured directly to the vertical web plate of the central floor assembly tunnel or of the lateral longitudinal member.

Especially in the case of wide motor vehicle bodies of two-door construction, in which the two front motor vehicle seats mounted with longitudinal sliding mobility are made narrower in order to facilitate access to the rear three-seated bench seat, the bracing of the C-shaped guide rails directly on the lateral longitudinal members leads to the necessity of laterally projecting connecting trusses or brackets which are placed awkwardly in the access to the rear bench seat. Even if the C-shaped guide rails are not fixed directly to the lateral longitudinal members, but are braced against angle brackets fixed to the vehicle floor, the great guide length causes the ends of the guide rails to project in front of or behind the motor vehicle seat and to prejudice both the access to the rear bench seat and the foot space of the passengers sitting in the rear.

Furthermore, the known motor vehicle seat also exhibits the disadvantage that it requires (for the purpose of determining the desired seat position) a latch rail arranged within the C-shaped guide rail which cooperates with a latch device. The known motor vehicle seat further has the disadvantage that it fails to satisfy the desideratum of a modern motor vehicle seat to anchor at least the lock part of the safety belt directly on the seat frame.

The aim of the invention is to improve a motor vehicle seat of the type initially mentioned so that for a substantially reduced structural outlay better access and foot space conditions are achieved and, furthermore, a determination of the desired seat position and a reliable locking of the seat frame with reference to the guide rail in the case of accident stresses are achieved in a simple manner. This aim is achieved according to the invention in that a motor vehicle seat of the type initially defined exhibits the features disclosed in the patent claims.

Due to the fact that on the seat frame the connecting trusses or brackets adjacent the outer wall of the vehicle exhibit approximately half the mutual interval of the connecting trusses located centrally of the vehicle and the respective length of the guide rails corresponds to the interval of the slide blocks of one side plus the seat adjustment range, an asymmetrical arrangement of the C-shaped guide rails is achieved whereby in the region of access to the rear bench seat the ends of the guide rail adjacent the outer wall of the vehicle are no longer awkwardly present. Due to the fact that the arrangement of the connecting brackets on the seat frame forms, in plan, an equiangular or oblique parallelogram with its short side external to the vehicle, reliable guidance and bracing of the motor vehicle seat is achieved by the greater guide length of the guide rail at the inner side of the seat despite a short guide rail on the outer side of the seat.

Due to the fact that the C-shaped guide rail, at least the guide rail fixed to the web surface of the central floor assembly tunnel, is constructed at its downwardly bent longitudinal edge in its front part as a latch engageable rail provided with teeth for the latch device and in its rear part as a securing rail for a locking part, a simple determination of the desired seat position is permitted, and by the locking part designed in conformity with the prior German patent publication DE No. 28 20 589 for "Safety Belt Fastening Components for a Lengthwise Adjustable Motor Vehicle Seat" laid open to the public on Nov. 11, 1979, of the applicant company, a reliable locking of the seat frame with reference to the guide rail in the case of an accident stress is ensured.

Although the different construction of the C-shaped guide rails must initially be regarded as an increase in costs, it must nevertheless be pointed out that in this way the possibility is created to construct the guide rail at the outer side of the vehicle seat more simply in conformity with the lower stresses, whereas the guide rail on the inner side of the vehicle seat can be executed correspondingly stably and expensively in conformity with the higher stresses resulting from the anchorage of the safety belt lock section. Obviously, the two guide rails may nevertheless also possess the same construction, except for their different length.

DESCRIPTION OF THE DRAWINGS

The invention will be explained more fully with reference to an exemplary embodiment illustrated in the accompanying drawings, wherein:

FIG. 1 shows a side elevation of a motor vehicle seat mounted for longitudinal sliding mobility according to the invention;

FIG. 2 shows a plan of the motor vehicle seat in FIG. 1, while only the seat contours are indicated and the actual seat frame has been omitted in order to show more clearly the arrangement of the guide rails; and FIG. 3 shows a section made along the line 3—3 in FIG. 2 from the left-hand part of which the catch device for determining the desired seat position and from the right-hand part the locking device for locking the seat frame with reference to the guide rail in the event of an accident stress may be seen.

DETAILED DESCRIPTION OF THE INVENTION

Referring now to the drawings, a motor vehicle seat 1 is provided with a seat frame 2 which is supported by slide blocks 7 and 8, or 9 and 10 fixed to lateral connecting or supporting trusses or brackets 3 and 4 on the outer side of the vehicle seat 1, and connecting trusses or brackets 5 and 6 on the inner side of the vehicle seat 1 in two parallel, upright, C-shaped guide rails 11 and 12.

The connecting trusses or brackets 3 and 4 fixed to the outer side of the seat frame 2 here exhibit approximately half the mutual interval of the connecting trusses or brackets 5 and 6 on the inner side of the vehicle seat frame. The respective length of the guide rails 11 or 12 corresponds in this case to the interval of the slide blocks 7 and 8, or 9 and 10 of one side plus the desired seat adjustment range.

The guide rail 11, external to the vehicle, is braced in this case by a front angle bracket 13 through a crossmember 14 and through a rear angle bracket 15 directly against the floor assembly 16 of the motor vehicle. The guide rail 12, internal to the vehicle, is preferably fixed directly to the approximately vertical web surface 17 of the central floor assembly tunnel 18.

As may be seen from FIG. 2, the connecting trusses or brackets 3, 4, 5 and 6 on the seat frame 2 are arranged in the form of a parallelogram. Depending upon the desired access and foot space conditions, said parallelogram may be of equiangular or oblique construction.

The motor vehicle seat 1 is provided with a latch device 19 for determining the desired seat position. The latch device 19 substantially comprises a stirrup 20 which is firmly connected to two levers 21 and 22 which are mounted pivotably at the front connecting trusses or brackets 3 and 5. The levers 21 and 22 exhibit straps 23 and 24 projecting into the C-shaped guide rails 11 and 12 with latch apertures 25, see FIG. 2.

The C-shaped guide rails 11 and 12 are constructed at their downwardly bent longitudinal edges in their front part as latch rails provided with teeth 26 which cooperate with the latch device 19.

The motor vehicle seat 1 is further provided with an anchorage device 27 for locking the seat frame 2 with reference to the guide rail 12 in the event of an accident stress. The anchorage device 27 substantially comprises a locking part 28 which is fixed to the rear connecting truss or bracket 6. The lock section 29 of a safety belt is fixed to the upper end of the locking part 28. The rear end 30 of the locking part 28 forms a U-shaped channel at the base of which cam indentations 31 are arranged opposite and staggered. Said cam indentations 31 normally travel without contact past the downwardly bent longitudinal edge of the guide rail 12. Only in the event of an accident stress on the locked section 29 is the locking part 28 pivoted or deformed and the lower section 30 of the locking part 28 comes into engagement by the cam indentations 31 with the downwardly bent longitudinal edge of the guide rail 12 and deforms the latter undulatorily in conformity with the opposite and staggered cam indentations 31, whereby a longitudinal displacement of the seat frame 2 within the guide rail 12 is reliably prevented. The precise construction and functioning of this locking part 28 is an object of the prior patent application P 28 20 589.2 and therefore need not be further explained here.

The foregoing explanation of the exemplary embodiment shown in the drawings clearly shows that the motor vehicle seat according to the invention not only makes possible improved access and foot space conditions for the rear seat passengers for a minimum structural outlay, but furthermore also ensures a simple determination of the desired seat position and a reliable locking of the seat in the event of accident stresses.

We claim:

1. A motor vehicle seat mounted for longitudinal sliding mobility over a predetermined seat position adjustment range,
   the seat having a frame supported on a plurality of slide blocks slidable on two longitudinally extending, spaced, parallel, upright, C-shaped guide rails anchored to a vehicle floor,
   each of the slide blocks being carried on a depending bracket secured to inner and outer longitudinally extending side frame members of the seat frame,
   one of the C-shaped guide rails being fixed to a substantially vertical web surface of a centrally located vehicle floor assembly tunnel and the other adjacent an outer vehicle body wall,
   and the seat frame being provided with a latch device engageable with latch device engageable means for the determination of the seat position,
   wherein the improvement comprises:
   at least two longitudinally spaced depending brackets on each seat side frame member,
   the distance between the forwardmost and rearwardmost brackets secured to the outer side of the seat frame being approximately half the mutual interval between the forwardmost and rearwardmost brackets on the inner side frame member of the seat frame,
   the arrangement of the depending brackets on the seat frame is, in plan, an equiangular or oblique parallelograms with its short side adjacent the other wall of the vehicle,
   and the respective lengths of the outer and inner guide rails correspond to the distance between the forwardmost and rearwardmost slide blocks on each side frame of the seat plus the length of the seat position adjustment range.

2. A motor vehicle seat according to claim 1, in which:
   at least the one C-shaped guide rail fixed to the web surface of the centrally located floor assembly tunnel has at its forward end the latch device engageable means thereon,
   the latch device engageable means consisting of a plurality of teeth engageable by the latch device,
   and the one C-shaped guide rail at its rear end has an anchorage device for locking the seat frame to the guide rail to further prevent longitudinal displacement of the seat frame under vehicle impact induced stresses.

3. A motor vehicle seat according to claim 1, in which:
   the C-shaped guide rails have at their forward ends the latch device engageable means thereon,
   the latch device engageable means consisting of a plurality of teeth on a downwardly bent longitudinal edge of the rail,
   and the C-shaped guide rails have at their rearward ends an anchorage device for locking the seat frame to the guide rail to further prevent longitudinal displacement of the seat frame under vehicle impact induced stresses.

* * * * *

UNITED STATES PATENT AND TRADEMARK OFFICE
CERTIFICATE OF CORRECTION

PATENT NO. : 4,281,871
DATED : August 4, 1981
INVENTOR(S) : Heinz Grittner and Ralf Giese It is certified that error appears in the above-identified patent and that said Letters Patent are hereby corrected as shown below:

On the title page, add the following:

[30] Foreign Application Priority Data
April 9, 1979 [DE] Fed. Rep. of Germany 2914229.8

Column 4, line 30, cancel "other" and substitute --outer--.

Signed and Sealed this

Twentieth Day of October 1981

[SEAL]

Attest:

GERALD J. MOSSINGHOFF

Attesting Officer

Commissioner of Patents and Trademarks